United States Patent [19]
Lubieniecki

[11] Patent Number: 5,635,090
[45] Date of Patent: Jun. 3, 1997

[54] TWO POSITION ADJUSTABLE NOZZLE

[75] Inventor: Victor Lubieniecki, Lansing, Ill.

[73] Assignee: Illinois Tool Works Inc., Glenview, Ill.

[21] Appl. No.: 612,272

[22] Filed: May 23, 1996

[51] Int. Cl.⁶ .................................................. B23K 9/173
[52] U.S. Cl. ........................... 219/137.42; 219/136
[58] Field of Search ..................... 219/137.42, 137.43, 219/137.2, 137.31, 137.62, 136; 285/417, 302, 303

[56] References Cited

U.S. PATENT DOCUMENTS

| | | |
|---|---|---|
| 2,797,301 | 6/1957 | Copleston . |
| 2,827,550 | 8/1958 | Unrath ................................. 219/137.43 |
| 3,283,121 | 11/1966 | Bernard et al. . |
| 3,428,778 | 2/1969 | Blackman et al. . |
| 3,469,070 | 9/1969 | Bernard et al. . |
| 3,514,570 | 5/1970 | Bernard et al. . |
| 3,544,758 | 12/1970 | Molin . |
| 3,594,021 | 7/1971 | Williams ................................. 285/302 |
| 3,689,733 | 9/1972 | Matasovic . |
| 3,909,585 | 9/1975 | Sanders et al. . |
| 4,268,740 | 5/1981 | Sanders . |
| 4,282,419 | 8/1981 | Auer . |
| 4,297,561 | 10/1981 | Townsend et al. . |
| 4,361,747 | 11/1982 | Torrani . |
| 4,482,797 | 11/1984 | Shiramizu et al. . |
| 4,544,827 | 10/1985 | Cusick, III . |
| 4,554,432 | 11/1985 | Raloff . |
| 4,560,858 | 12/1985 | Manning . |
| 4,695,702 | 9/1987 | Gartland . |
| 4,702,539 | 10/1987 | Cusick, III et al. . |
| 4,783,099 | 11/1988 | Muser ................................. 285/417 |
| 4,791,266 | 12/1988 | Gerard . |
| 4,864,099 | 9/1989 | Cusick, III et al. . |
| 4,937,428 | 6/1990 | Yoshinaka et al. . |
| 5,097,108 | 3/1992 | Hamal . |
| 5,338,917 | 8/1994 | Stuart et al. . |
| 5,349,158 | 9/1994 | Mari . |
| 5,384,447 | 1/1995 | Raloff et al. . |
| 5,440,100 | 8/1995 | Stuart et al. . |

FOREIGN PATENT DOCUMENTS 51-61454  5/1976  Japan ................. 219/137.42

Primary Examiner—Clifford C. Shaw
Attorney, Agent, or Firm—Mack W. Croll; Thomas W. Buckman; John P. O'Brien

[57] ABSTRACT

A GMAW gun has a nozzle that is axially slidable over a gas diffuser. The nozzle is positively located in one of two different positions by a double counterbored insulator in cooperation with an insulative retaining ring. When the double counterbored insulator is installed in a first orientation on the gun, the nozzle abuts a first surface of the double counterbored insulator to provide a first positive stop. When the double counterbored insulator is installed in a second orientation, the nozzle abuts a second surface of the double counterbored insulator to provide a second positive stop. The various components of the gun are dimensioned such that a contact tip protrudes from the nozzle when the nozzle is at the first positive stop, and the contact tip is recessed into the nozzle when the nozzle is at the second positive stop.

11 Claims, 2 Drawing Sheets

TWO POSITION ADJUSTABLE NOZZLE

BACKGROUND OF THE INVENTION

1. Field of the Invention

This invention pertains to gas metal arc welding (GMAW), and more particularly to nozzles that direct an inert gas around GMAW arcs.

2. Description of the Prior Art

The gun of a gas metal arc welding (GMAW) system typically includes a nozzle that surrounds a gas diffuser and a contact tip. A weld wire is fed out of the contact tip. Electrical current conducted to the weld wire from the gas diffuser and the contact tip enables an arc to be struck and maintained between the weld wire and a workpiece. An inert gas is pumped through and out of the gas diffuser near the contact tip. A nozzle directs the gas to surround the weld wire and thus shield the welding arc from the atmosphere.

The spatial relationship between the ends of the contact tip and the nozzle is important, and that relationship varies with different welding jobs. Depending on the particular welding application, it may be desirable for the end of the contact tip to extend out past the end of the nozzle. In other applications, it may be better that the end of the contact tip be recessed inside the nozzle. Accordingly, it is well known to make the nozzle adjustable on the gun, usually by enabling the nozzle to slide on the gas diffuser.

FIGS. 1 and 2 show a portion of a prior mig welding gun 1 in which a nozzle 3 is axially slidable over rings 5 on a tubular insulator 7. The insulator 7 is pressed onto a gas diffuser 9. A contact tip 11 is secured to the gas diffuser 9. In FIG. 1, the nozzle 3 is pushed completely onto the insulator 7 such that a beveled shoulder 13 contacts the front end 15 of the insulator. In that situation, the nozzle is at a positive stop and is at a location where the end 17 of the contact tip 11 protrudes from the end 19 of the nozzle. In FIG. 2, the nozzle is pulled away from the positive stop and partially off the insulator 7 to a typical location at which the contact tip end 17 is recessed inside the nozzle. It is thus seen that the nozzle acts against a positive stop at only one location of the nozzle on the gas diffuser.

U.S. Pat. No. 2,659,797 describes another arc welding gun having a nozzle that acts against a positive stop at one location of the nozzle.

U.S. Pat. No. 5,380,980 discloses an adjustable slip-fit welding nozzle in which the nozzle acts against a positive stop for all locations of the nozzle on a gas diffuser.

A welding gun is desired that has more than one positive stop for a nozzle but the nozzle is not in contact with the positive stops at all nozzle locations.

SUMMARY OF THE INVENTION

In accordance with the present invention, a two position adjustable nozzle is provided for a gas metal arc welding (GMAW) gun that is positively located at two predetermined positions relative to a contact tip. This is accomplished by apparatus that includes a double counterbored insulator that is reversible on the welding gun.

The welding gun comprises a gas diffuser having one end assembled to a gun conductor tube. The contact tip is joined to the other end of the gas diffuser. A series of rings circumferentially surround the gas diffuser. A tubular insulator is pressed into the nozzle. The insulator has an inner diameter that slides axially with controlled friction on the gas diffuser rings. The nozzle has upstream and downstream ends and an outer diameter of a controlled size.

A retaining ring is permanently captured between the gas diffuser and an outer tube of the gun. The retaining ring is made of an insulative material. It has a circumferential outer surface of the same diameter as the nozzle outer diameter. The retaining ring circumferential outer surface terminates in a step.

The double counterbored insulator is generally tubular in shape. It has first and second opposed ends and a wall with an inner diameter. The inner diameter is sized to fit snugly over both the circumferential outer surface of the retaining ring and the outer diameter of the nozzle. The double counterbored insulator also has a shoulder that extends inwardly from the inner diameter. The shoulder has first and second opposed radial surfaces. The distance from the shoulder first radial surface to the first end is greater than the distance from the shoulder second radial surface to the second end.

The double counterbored insulator can be installed on the gun in either of two orientations. In a first orientation, the inner diameter at the second end of the double counterbored insulator is placed over the retaining ring circumferential outer surface and against the retaining ring step. When the double counterbored insulator is installed in its first orientation, the nozzle outer diameter fits snugly inside the inner diameter at the first end of the double counterbored insulator. The nozzle is slidable, by means of the tubular insulator, over the gas diffuser rings until the nozzle upstream end abuts the first radial surface of the double counterbored insulator shoulder. In that manner, the double counterbored insulator first radial surface provides a first positive stop for the nozzle. The various components of the welding gun may be dimensioned such that the working end of the contact tip protrudes a desired amount from the downstream end of the nozzle when the nozzle upstream end is at the positive stop.

In a reverse or a second orientation, the double counterbored insulator is installed on the gun such that its inner diameter at the first end is placed over the retaining ring circumferential outer surface and against the retaining ring step. The nozzle is slidable over the gas diffuser rings until the nozzle upstream end abuts the second radial surface of the shoulder of the double counterbored insulator. Accordingly, a second positive stop is provided for the nozzle. The working end of the contact tip may be recessed inside the downstream end of the nozzle when the nozzle is at the second positive stop.

The method and apparatus of the invention, using a double counterbored insulator having unequal counterbore depths, thus enables a GMAW gun to have two positive stops for the nozzle relative to the contact tip. The probability of one or the other positive stop providing a desired relative position between the nozzle and the contact tip is relatively high, even though the nozzle can be slid to other positions relative to the contact tip.

Other advantages, benefits, and features of the present invention will become apparent to those skilled in the art upon reading the detailed description of the invention.

DETAILED DESCRIPTION OF THE PREFERRED EMBODIMENT

Figure 1:
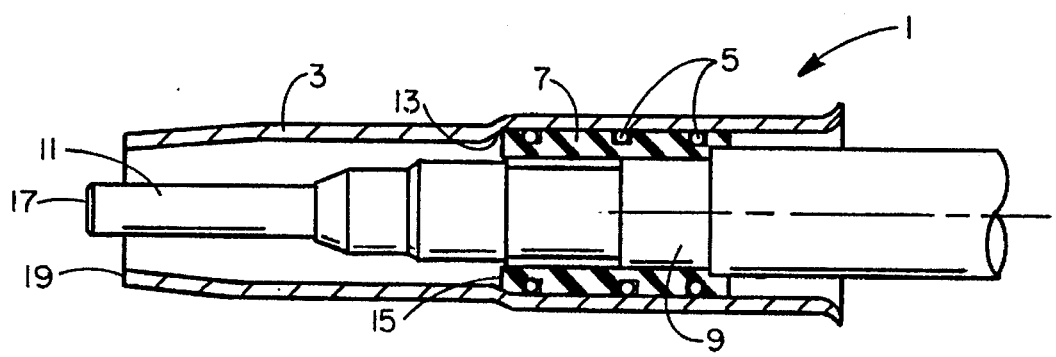
FIG. 1 is a simplified cross sectional view of a portion of a prior GMAW gun showing a nozzle at a positive stop that locates the nozzle at a first location relative to a contact tip.
Figure 2:
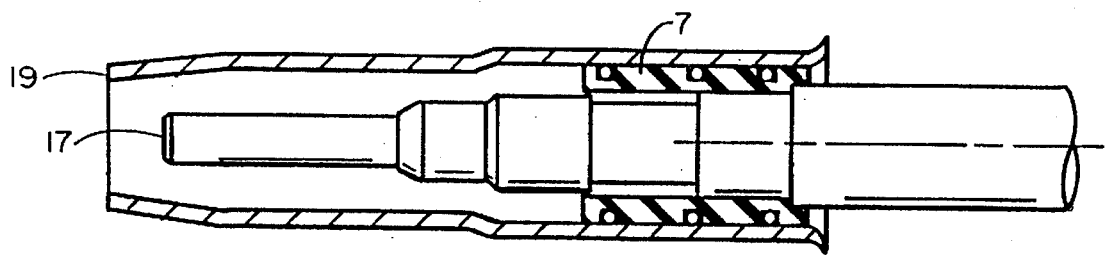
FIG. 2 is a view similar to FIG. 1, but showing the nozzle at a different location relative to the contact tip.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 3–6, a portion of a gas metal arc welding (GMAW) gun 21 is illustrated that includes the present invention. The welding gun 21 is comprised of an outer tube 23 partially surrounding a hollow conductor tube 25. A gas diffuser 27 has a first end 29 that is assembled to the conductor tube 25. One end 30 of a contact tip 31 is threaded or otherwise joined to the gas diffuser second end 33. A nozzle 35 surrounds the gas diffuser 27 and the contact tip 31. The nozzle 35 has an upstream 37, a downstream 39, an outer diameter 41 and an inner diameter 43. A tubular insulator 45 is pressed into the nozzle inner diameter 43. The inner diameter 47 of the tubular insulator 45 is held with controlled friction on the gas diffuser by a pair of metal 0-rings 49 and a pair of synthetic O-rings 51 that are suitably recessed into the gas diffuser outer diameter 53. The tubular insulator inner diameter 47 and the O-rings 49 and 51 cooperate to enable the tubular insulator, and thus the nozzle, to slide axially on the gas diffuser in the directions of arrows 83 and 85.

In accordance with the present invention, the nozzle 35, with the tubular insulator 45, is locatable at two predetermined positions on the welding gun 21 with positive stops. Looking especially at FIG. 4, the first positive stop locates the nozzle relative to the contact tip 31 such that the contact tip working end 55 protrudes a distance X beyond the nozzle downstream end 39. When the nozzle is at the second positive stop, the contact tip working end 55 is recessed a distance Y from the nozzle downstream end 39, FIG. 6.

In the illustrated construction, the positive stops are obtained by a double counterbored insulator 57 in conjunction with a retaining ring 59. The retaining ring 59 has an inner diameter 61 and an annular flange 67. The inner diameter 61 fits over the gun outer tube 23, and the annular flange 67 is permanently captured between the outer tube and the first end 29 of the gas diffuser 27. The retaining ring has a circumferential outer surface 63 that terminates in a transverse step 65. The retaining ring is preferably made from an insulative material such as Teflon TFE.

The double counterbored insulator 57 is fabricated with a first end 69, a second end 71, and an inner diameter 73. The double counterbored insulator inner diameter 73 is sized to fit snugly over the outer diameter 41 of the nozzle 35 and also over the circumferential outer surface 63 of the retaining ring 59. The inner diameter may have a pair of short annular lips, not shown in the drawings, adjacent the first and second ends 69 and 71, respectively. The double counterbored insulator further has a shoulder 75 extending from the inner diameter. The shoulder 75 has a first radial surface 77 and a second radial surface 79. The distance of the first radial surface 77 from the first end 69 is greater than the distance of the second radial surface 79 from the second end 71. The double counterbored insulator is made from a Teflon TFE plastic material.

Figure 4:
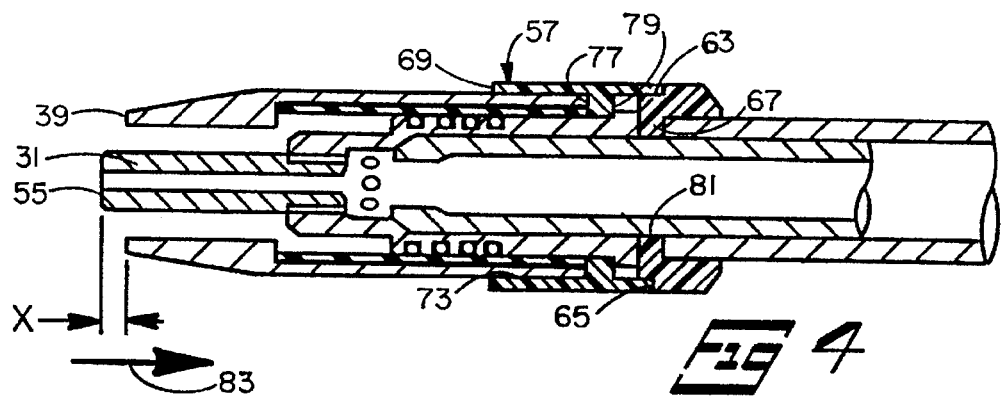
FIG. 4 is a view similar to FIG. 3, but showing the nozzle at the first positive stop.
Figure 6:
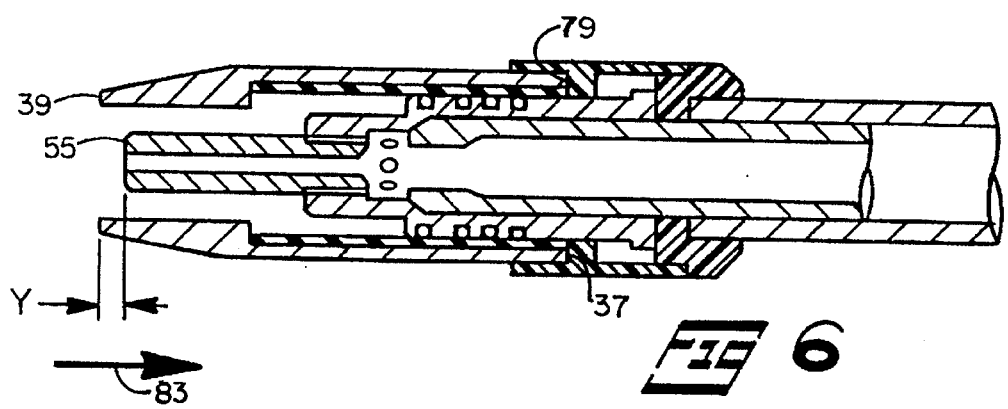
FIG. 6 is a view similar to FIG. 5, but showing the nozzle at a second positive stop.

Looking also at FIG. 6, the double counterbored insulator 57 can be selectively installed on the welding gun 21 in either of two orientations. In the first orientation, shown in FIG. 4, the inner diameter 73 of the double counterbored insulator second end 71 is slid over the circumferential outer surface 63 of the retaining ring 59 and against the retaining ring transverse step 65. The inner diameter 81 of the flange 67 fits snugly over the gas diffuser outer diameter 53. The nozzle outer diameter 41 fits snugly inside the double counterbored insulator inner diameter 73 at the first end 69 thereof. In FIG. 4, the nozzle upstream end 37 abuts the double counterbored insulator first radial surface 77, so that the surface 77 provides a first positive stop for axially locating the nozzle in the direction of arrow 83. In one embodiment, the nozzle, contact tip 31, double counterbored insulator, and other components are so dimensioned that the contact tip working end 55 protrudes a distance X from the nozzle downstream end 39 when the nozzle is at the first positive stop. For many welding applications, a satisfactory dimension for the distance X is approximately 0.13 inches.

Figure 3:
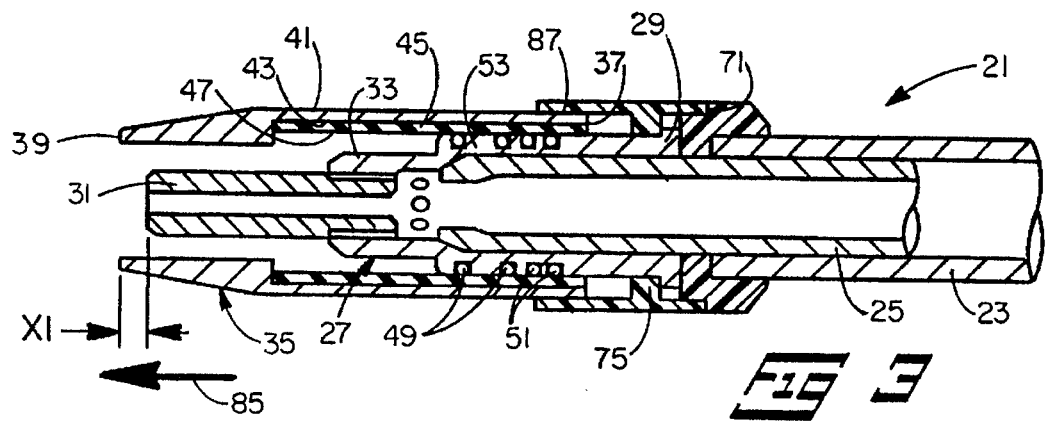
FIG. 3 is a cross sectional view of a portion of a GMAW gun according to the invention showing a double counterbored insulator installed in a first orientation and a nozzle at a position remote from a first positive stop for the nozzle.

In FIG. 3, the nozzle 35 is shown slid axially in the direction of arrow 85 such that the nozzle upstream end 37 is away from the double counterbored insulator first radial surface 77. The nozzle may be slid in the direction of arrow 85 until the working end 39 of the contact tip 31 is recessed inside the nozzle downstream end 39, as, for example, by a distance X1. For the recessed distance X1, an overlap 87 is maintained between the double counterbored insulator first end 69 and the nozzle upstream end 37.

Figure 5:
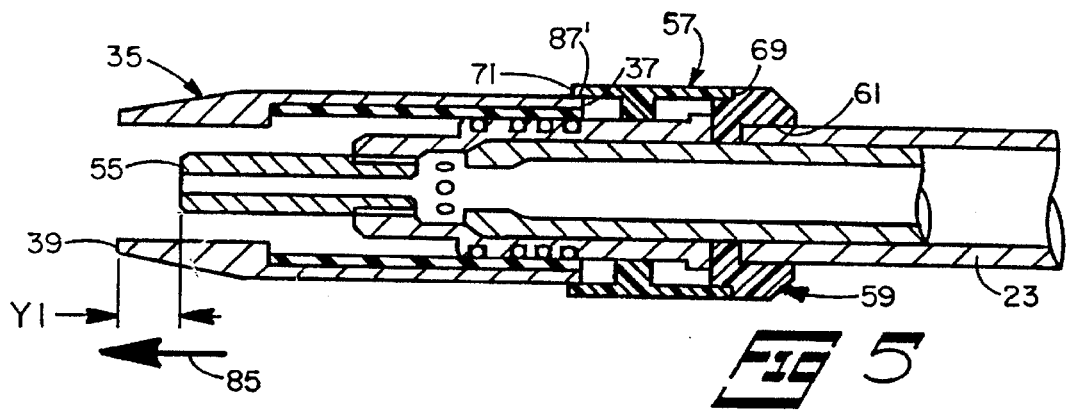
FIG. 5 is a cross sectional view similar to FIG. 3, but showing the double counterbored insulator installed in a second orientation.

Now turning to FIGS. 5 and 6, the double counterbored insulator 57 is installed on the welding gun 21 in a second orientation. In the second orientation, the inner diameter 73 of the double counterbored insulator at the first end 69 thereof is placed over the retaining ring circumferential outer surface 63 and against the transverse step 65. The nozzle outer diameter 41 at the upstream end 37 then fits inside the double counterbored insulator inner diameter 73 at the second end 71 thereof. In FIG. 4, the nozzle upstream end abuts the second radial surface 79 of the double counterbored insulator. The double counterbored insulator surface 79 thus provides a second positive stop for the nozzle in the direction of arrow 83. The various welding gun components may be dimensioned such that the contact tip working end 55 is recessed a distance Y inside the nozzle downstream end 39 when the nozzle is at the second positive stop. A satisfactory distance Y is approximately 0.13 inches.

In FIG. 4, the nozzle 35 has been slid axially in the direction of arrow 85 until the contact tip working end 55 is recessed a distance Y1 inside the nozzle downstream end 39. In that situation, an overlap 87' exists between the double counterbored insulator second end 71 and the nozzle upstream end 37. A maximum distance Y1 of approximately 0.31 is satisfactory.

Thus, it is apparent that there has been provided, in accordance with the invention, a two position adjustable nozzle for a GMAW welding gun that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A two position adjustable nozzle for a gas metal arc welding (GMAW) gun comprising:
   a. a conductor tube;
   b. a gas diffuser assembled to the conductor tube;
   c. a contact tip having a first end joined to the gas diffuser and a working end;
   nozzle means for sliding axially along the gas diffuser; and
   e. insulator means installed on the gas diffuser for selectively providing first and second positive stops for the nozzle means relative to the contact tip working end.

2. The two position adjustable nozzle of claim 1 wherein the insulator means comprises:
   a. an insulative retaining ring surrounding the conductor tube; and
   b. a double counterbored insulator having first and second ends, an inner diameter, and a shoulder extending from the inner diameter, the shoulder having a first radial surface at a first predetermined distance from the first end, and a second radial surface at a second predetermined distance less than the first predetermined distance from the second end, the double counterbored insulator being selectively installed on the gas diffuser in a first orientation relative to the retaining ring to provide the first positive stop or in a second orientation relative to the retaining ring to provide the second positive stop.

3. The two position adjustable nozzle of claim 2 wherein the double counterbored insulator second end is installed on the retaining ring when the double counterbored insulator is installed in the first orientation, and wherein the double counterbored insulator first end is installed on the retaining ring when the double counterbored insulator is installed in the second orientation.

4. The two position adjustable nozzle of claim 2 wherein:
   a. the nozzle means abuts the double counterbored insulator first radial surface when the double counterbored insulator is installed in the first orientation to locate the nozzle means at the first positive stop; and
   b. the nozzle means abuts the double counterbored insulator second radial surface when the double counterbored insulator is installed in the second orientation to locate the nozzle means at the second positive stop.

5. The two position adjustable nozzle of claim 4 wherein:
   a. the nozzle means comprises a tubular nozzle having an upstream end and an outer diameter;
   b. the nozzle upstream end abuts the first radial surface of the double counterbored insulator and the nozzle outer diameter fits snugly inside the inner diameter of the double counterbored insulator at the first end thereof when the nozzle is at the first positive stop; and
   c. the nozzle upstream end abuts the second radial surface of the double counterbored insulator and the nozzle outer diameter fits snugly inside the inner diameter of the double counterbored insulator at the second end thereof when the nozzle is at the second positive stop.

6. The two position adjustable nozzle of claim 2 wherein:
   a. the retaining ring defines a circumferential outer surface that terminates in a transverse step;
   b. the double counterbored insulator inner diameter at the first end thereof fits snugly over the retaining ring circumferential outer surface and abuts the retaining ring step when the double counterbored insulator is installed in the first orientation; and
   c. the double counterbored insulator inner diameter at the second end thereof fits snugly over the retaining ring circumferential outer surface and abuts the retaining ring step when the double counterbored insulator is installed in the second orientation.

7. The two position adjustable nozzle of claim 1 wherein the contact tip working end protrudes from the nozzle means when the nozzle means is at the first positive stop, and wherein the contact tip working end is recessed into the nozzle means when the nozzle means is at the second positive stop.

8. The two position adjustable nozzle of claim 7 wherein the contact tip working end protrudes from the nozzle means when the nozzle means is at the first positive stop a distance that is approximately equal to the distance the contact tip working end is recessed into the nozzle means when the nozzle means is at the second positive stop.

9. A method of positively locating a nozzle having an outer diameter on a GMAW gun comprising the steps of:
   a. installing a double counterbored insulator on the gun in a first orientation;
   b. sliding the nozzle toward the double counterbored insulator;
   c. abutting the nozzle against a first surface of the double counterbored insulator at a first positive stop for the nozzle;
   d. installing the double counterbored insulator on the gun in a second orientation;
   e. sliding the nozzle toward the double counterbored insulator; and
   f. abutting the nozzle against a second surface of the double counterbored insulator at a second positive stop for the nozzle.

10. The method of claim 9 wherein the step of installing a double counterbored insulator on the gun in a first orientation comprises the steps of:
    a. capturing a retaining ring on the gun;
    b. providing the double counterbored insulator with first and second ends at respective first and second distances from the first and second surfaces; and
    c. installing the double counterbored insulator second end over a circumferential outer surface of the retaining rings.

11. The method of claim 10 wherein the step of installing a double counterbored insulator on the gun in a second orientation comprises the step of installing the double counterbored insulator first end over the circumferential outer surface of the retaining ring.

* * * * *